United States Patent
Pollak et al.

(10) Patent No.: US 9,283,638 B2
(45) Date of Patent: Mar. 15, 2016

(54) DEVICE FOR FORMING LONGITUDINALLY SPACED GROOVES OR SLITS INTO A MATERIAL WEB WITH A FOCUSED LASER BEAM

(75) Inventors: Armin Pollak, Berg (DE); Günter Wurzer, München (DE)

(73) Assignee: Rofin-Baasel Lasertech GmbH & Co. KG, Starnberg (DE)

( * ) Notice: Subject to any disclaimer, the term of this patent is extended or adjusted under 35 U.S.C. 154(b) by 1004 days.

(21) Appl. No.: 13/369,648

(22) Filed: Feb. 9, 2012

(65) Prior Publication Data

US 2013/0134140 A1    May 30, 2013

Related U.S. Application Data

(60) Provisional application No. 61/563,658, filed on Nov. 25, 2011.

(51) Int. Cl.
   *B23K 26/16* (2006.01)

(52) U.S. Cl.
   CPC ............ *B23K 26/16* (2013.01); *B23K 26/0821* (2015.10); *B23K 26/364* (2015.10)

(58) Field of Classification Search
   CPC .......... B23K 26/0815; B23K 26/4086; B23K 26/0643; B23K 26/0648; B23K 26/367; B23K 26/385
   See application file for complete search history.

(56) References Cited

U.S. PATENT DOCUMENTS

| | | | | |
|---|---|---|---|---|
| 4,864,098 | A | * | 9/1989 | Basanese et al. ........ 219/121.61 |
| 5,403,990 | A | * | 4/1995 | Fukuchi .................... 219/121.7 |
| 5,684,617 | A | * | 11/1997 | Langhans .................. 359/205.1 |
| 5,760,943 | A | * | 6/1998 | Kim et al. .................. 359/208.1 |
| 5,990,444 | A | * | 11/1999 | Costin ...................... 219/121.69 |
| 6,600,152 | B2 | | 7/2003 | Paul |
| 2007/0075063 | A1 | | 4/2007 | Wilbanks et al. |
| 2010/0196624 | A1 | * | 8/2010 | Ruuttu et al. ................. 427/569 |

FOREIGN PATENT DOCUMENTS

| | | |
|---|---|---|
| DE | 199 37 267 A1 | 2/2001 |
| DE | 102 25 387 A1 | 12/2003 |
| DE | 10 2004 012 081 A1 | 9/2005 |
| JP | 2008-26661 A | 2/2008 |

* cited by examiner

*Primary Examiner* — Tu B Hoang
*Assistant Examiner* — Amit K Singh
(74) *Attorney, Agent, or Firm* — Laurence A. Greenberg; Werner H. Stemer; Ralph E. Locher

(57) ABSTRACT

A device forms grooves or slits in a material web as it moves in a longitudinal direction. The grooves or slits, which are spaced apart from one another in the longitudinal direction, are formed by a laser beam. A laser beam source generates a continuous laser beam and a deflection mirror directs the laser beam onto the material web. The mirror rotates about an axis of rotation and it is displaceable along the axis. The mirror has a first mirror face, the line of intersection of which with a sectional plane perpendicular with respect to the axis of rotation forms a circular arc which varies depending on the axial position of the sectional plane. A second mirror face deflects the laser beam towards an absorber. Focusing optics focus the laser beam, after reflection from the first mirror face, onto the moving material web.

14 Claims, 4 Drawing Sheets

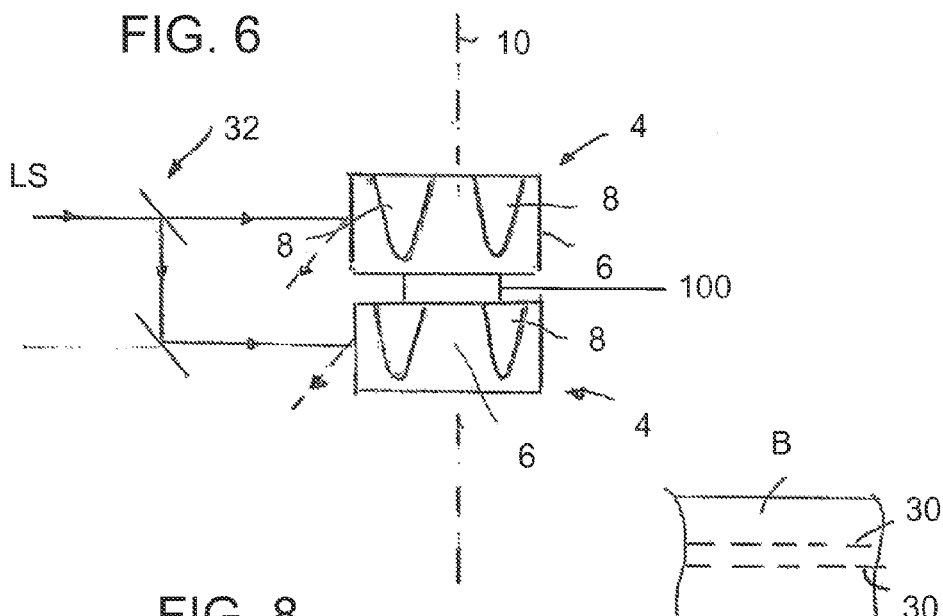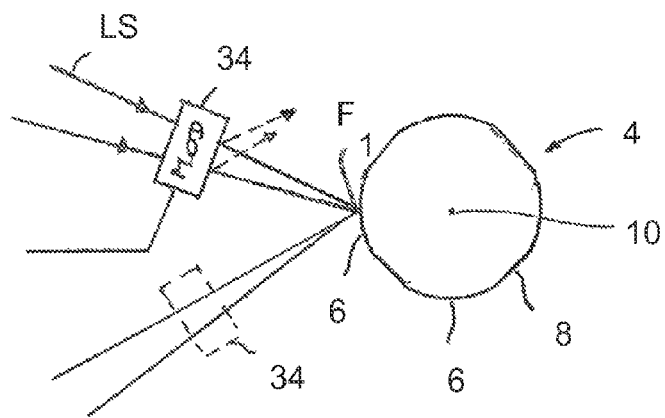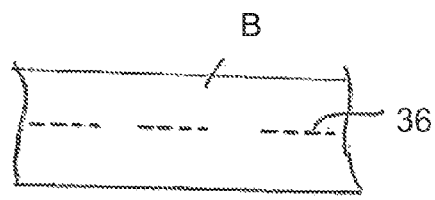

FIG. 10
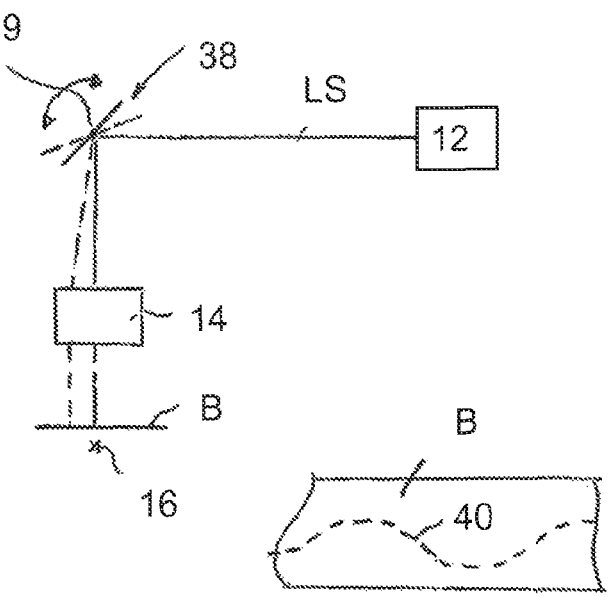
FIG. 11
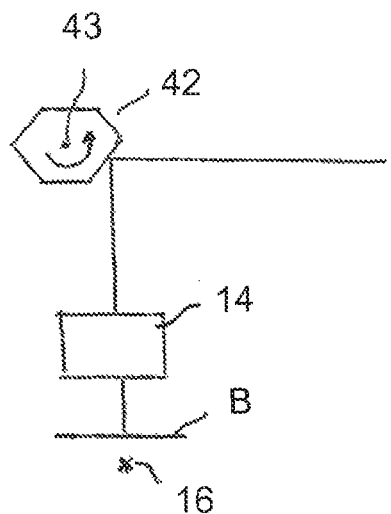
FIG. 12
FIG. 13
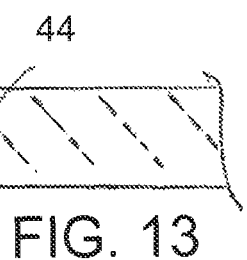

DEVICE FOR FORMING LONGITUDINALLY SPACED GROOVES OR SLITS INTO A MATERIAL WEB WITH A FOCUSED LASER BEAM

CROSS-REFERENCE TO RELATED APPLICATION

This application claims the benefit, under 35 U.S.C. §119 (e), of provisional patent application No. 61/563,658 filed Nov. 25, 2011; the prior application is herewith incorporated by reference in its entirety.

BACKGROUND OF THE INVENTION

Field of the Invention

The invention relates to a device for forming grooves or slots, which are spaced apart from each other in a longitudinal direction, by means of a laser beam into a material web, which is moved in the longitudinal direction.

Packaging films, in particular packaging films for packaging foodstuffs, are provided in a plurality of applications with longitudinal grooves spaced apart from each other, which serve as a tear-open aid. The longitudinal grooves extend only up to a certain depth such that the barrier properties of the packaging film are maintained in order to protect the packaged foodstuffs from light, oxygen, moisture, drying out, contamination or loss of aroma.

The insertion of these types of grooves is effected in many cases by way of a focused laser beam while the packaging film is being wound from a storage roll onto a take-up roll.

In order to be able to insert grooves at a constant length, constant depth and constant spacing into a moving material web of this type by means of a laser beam, it is known to use a laser beam source which generates a pulsed laser beam, the frequency and pulse duration of which is varied with the changing speed of the material web, at the same time the laser output per pulse having to be kept constant. In this case, it has been shown that a method of this type cannot fulfill the demands made in practice—variation in the web speed of 2-10 m/s, adjustment of the duty cycle (product of pulse duration and pulse frequency) within a frequency range of 5-100 kHz as well as for pulse durations of between 5 and 100 µs at the same time maintaining the laser output per pulse—or can only fulfill them with very high amounts of technical expenditure.

As an alternative to this, it is also possible to generate a pulsed laser beam from a continuous laser beam with the aid of a rotating diaphragm disk, for example a finger or apertured disk. In this case, the laser beam is focused onto the diaphragm disk through a lens. The diaphragm disk is set at an acute angle to the beam axis. If the beam contacts a finger, the energy is directed, by reflection at the finger, into an absorber and is thermally nullified. The resulting pulsed laser beam is parallelized once more through a lens arranged downstream of the diaphragm disk and is able to be directed to the operating point via the deflection mirror. A further lens then focuses the parallelized laser beam onto the material web. The ratio between finger and slot width produces the duty cycle, a changeable web speed being balanced out via entrainment of the rotational speed of the diaphragm disk.

A disadvantage of that method is that the edges of the diaphragms are subject to an extreme thermal load such that the service life of the diaphragm disks is severely reduced in the case of output in the kW (kilowatt) range. Over and above this, stepless adjustment of the duty cycle, frequently demanded in practice, can only be realized with difficulty.

SUMMARY OF THE INVENTION

It is accordingly an object of the invention to provide a device for forming longitudinally spaced-apart grooves or slits into a material web, which device overcomes the above-mentioned disadvantages of the heretofore-known devices and methods of this general type and which makes it possible to fulfill the afore-depicted practical demands with a small amount of technical expenditure.

With the foregoing and other objects in view there is provided, in accordance with the invention, a device for forming grooves or slits in a material web while the material web is being moved in a longitudinal direction, the device comprising:

a laser beam source configured for generating a continuous laser beam;

a deflection mirror rotatably mounted about an axis of rotation and displaceable in a direction of the axis of rotation;

the deflection mirror having at least one first mirror face, a line of intersection of the mirror face with a sectional plane defined perpendicular with respect to the axis of rotation forming a circular arc about the axis of rotation, with an angular extent of the circular arc varying in dependence on an axial position of the sectional plane, and the first mirror face deflecting the laser beam into a first direction;

focusing optics disposed along the first direction for focusing the laser beam, after reflection from the first mirror face, onto the material web while the deflection mirror having at least one second mirror face disposed to deflect the laser beam in second directions, different from the first direction; and an absorber disposed material web is being moved in the longitudinal direction, for forming grooves or slits in the material web spaced apart from one another in the longitudinal direction;

along the second directions to receive the laser beam after reflection from the second mirror face.

In other words, the objects of the invention are achieve by way of a device that includes a laser beam source for generating a continuous laser beam and a deflection mirror, which rotates about an axis of rotation, is arranged so as to be displaceable in the direction thereof and has at least one first mirror face. The line of intersection of the first mirror face with a sectional plane perpendicular with respect to the axis of rotation forms a circular arc about the axis of rotation, the angle of curvature of which varies in dependence on the axial position of the sectional plane, and which deflects the laser beam into a first direction. The deflection mirror has at least one second mirror face, which deflects the laser beam in second directions, which deviate from said first direction, towards an absorber. After reflection from the first mirror face, the laser beam is focused onto the material web by way of a focusing optics.

Through these measures it is possible, simply by displacing the deflection mirror in an axial manner, to alter the duty cycle of the laser beam striking the material web, as the angle of curvature of the first mirror face depends on the axial position, in which the laser beam, focused preferably in an at least approximate manner onto the first mirror face, strikes the deflection mirror.

If the angle of curvature of the first mirror face reduces continuously in a direction parallel to the axis of rotation, the duty cycle is able to be altered in a stepless manner.

First and second mirror faces preferably directly adjoin each other. In other words: There are no intermediate regions between the mirror faces so that the laser beam always strikes either the first or second mirror face.

If the second mirror face is planar and oriented inclinedly with respect to the axis of rotation, the deflection mirror as claimed in the present invention is able to be produced in a particularly simple manner by corresponding faces being inserted into a circular cylindrical base body by means of surface milling.

Other features which are considered as characteristic for the invention are set forth in the appended claims.

Although the invention is illustrated and described herein as embodied in a device for inserting grooves or slots, which are spaced apart from each other in a longitudinal direction, by means of a laser beam into a material web, which is moved in said longitudinal direction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 shows one embodiment where two deflection mirrors are arranged on one common shaft;

FIG. 7 shows a perforated or incised pattern generated by means of the arrangement according to FIG. 6;

FIG. 8 shows a further advantageous development of the invention with an acousto-optic modulator arranged in the beam path of the laser beam;

FIG. 9 shows an example of a perforated or incised pattern generated by means of the arrangement according to FIG. 8;

FIG. 10 shows an embodiment with a deviation mirror arranged so as to be pivotable in the laser path of the laser beam;

FIG. 11 shows a perforated or incised pattern generated by means of the arrangement according to FIG. 10;

FIG. 12 shows an embodiment where a rotating polygonal mirror is arranged in the beam path of the laser beam; and FIG. 13 shows a perforated or incised pattern generated by means of the embodiment according to FIG. 12.

DETAILED DESCRIPTION OF THE INVENTION

Figure 1:
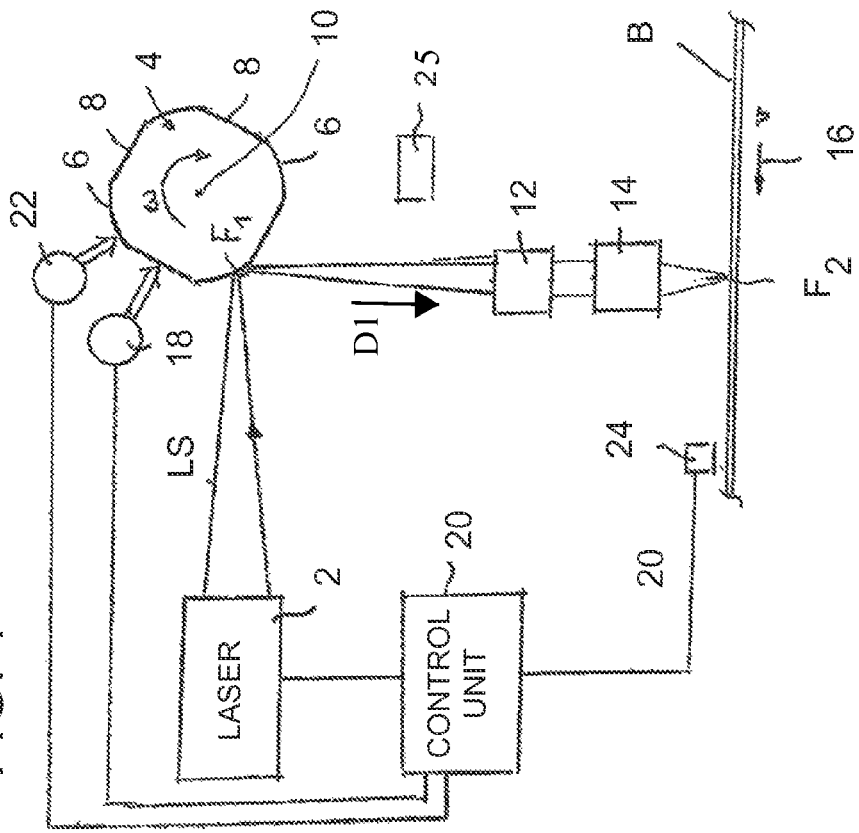
FIG. 1 shows a schematic diagrammatic sketch of a device according to the invention in a first position of the deflection mirror, in which the laser beam is directed onto the material web.

Referring now to the figures of the drawing in detail and first, particularly, to FIG. 1 thereof, there is shown a device according to the invention that includes a laser beam source 2 which generates a laser beam LS by way of focusing optics (not shown in any detail). The laser beam is focused in a first focal spot $F_1$. In the beam path of the laser beam LS there is disposed a deflection mirror 4, which has a plurality of mirror faces. In the exemplary embodiment the mirror 4 has four first mirror faces 6 as well as four second mirror faces 8, which, when the deflection mirror 4 rotates about an axis of rotation 10 that is perpendicular to the drawing plane, pass alternately into the beam path of the laser beam LS. The first mirror faces 6, in a sectional plane—the drawing plane—perpendicular to the axis of rotation 10, have the shape of a circular arc, the central point of which lies on the axis of rotation 10. In addition, the first mirror faces 6 extend parallel to the axis of rotation 10 such that they lie on an outer surface of a circular cylinder, the cylinder axis of which coincides with the axis of rotation 10. At least the first mirror faces 6 are situated approximately in the first focal spot $F_1$ of the laser beam LS.

The second mirror faces 8 are planar and are inclined with respect to the axis of rotation 10, i.e. with an inclination relative to the drawing plane. The first and second mirror faces 6 and 8 alternate in the circumferential direction and directly adjoin each other.

The laser beam LS striking the circular first mirror faces 6 is deflected into a first fixed direction D1 to a collimation optics 12, in which it is parallelized. With a focusing optics 14, the laser beam LS is focused in a second focal spot $F_2$ onto a material web B, which moves forward in a longitudinal direction 16. In addition, more planar deviation mirrors can be located between collimation optics 12 and focusing optics 14, by means of which deviation mirrors the collimated laser beam LS can be guided corresponding to the position and orientation of the material web B.

The rotating deflection mirror 4 is driven by a drive unit 18, which is controlled by a control unit 20. By way of a linear drive 22, which is also controllable by the control unit 20, the deflecting mirror 4 can also be displaced in the direction of the axis of rotation 10, i.e. perpendicular to the drawing plane.

The current web speed v of the material web B is detected by way of a sensor 24 and a corresponding measuring signal M is forwarded to the control unit 20, by way of which the laser performance and the rotational speed w of the deflection mirror 4 is controlled in dependence on the web speed v of the material web B.

As explained below, the duty cycle of the laser beam LS is set to the material web B by way of the axial position of the deflection mirror 4.

Figure 2:
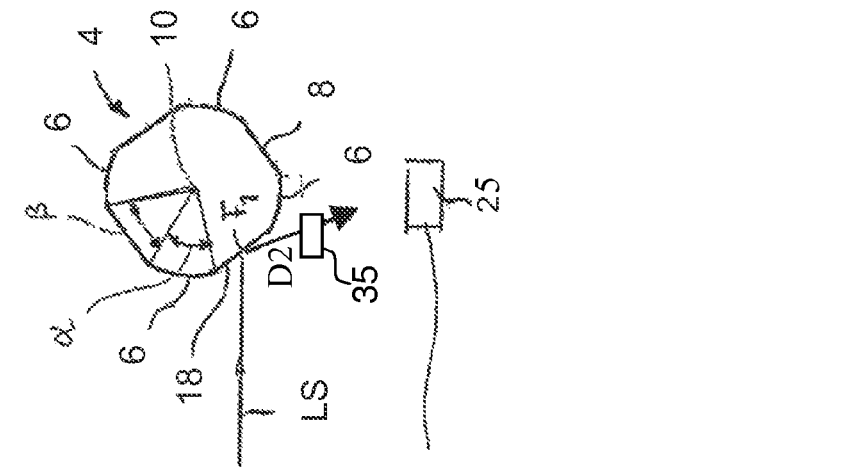
FIG. 2 shows the deflection mirror in a second position in which the laser beam striking it is directed towards an absorber.

FIG. 2 shows an operating situation where the deflection mirror 4 has rotated further in relation to the operating situation shown in FIG. 1, such that the laser beam LS no longer strikes the circular first mirror face 6 but rather the planar second mirror face 8. As the planar second mirror face 8 is oriented inclinedly with respect to the drawing plane, the laser beam LS is deflected out of the drawing plane into second directions D2 which deviate from the first direction D1, in which it strikes an absorber 25. The duty cycle is accordingly determined by the ratio between the angles of curvature α and β, which are associated with the first or second mirror face 6 or 8. The first mirror faces 6, in a sectional plane perpendicular to the axis of rotation 10, have in each case the same angle of curvature α and the second mirror faces have in each case the same angle of curvature β. As first and second mirror faces 6, 8 directly adjoin each other, four times the sum of the angles of curvature α and β amounts to 360°.

Figure 3:
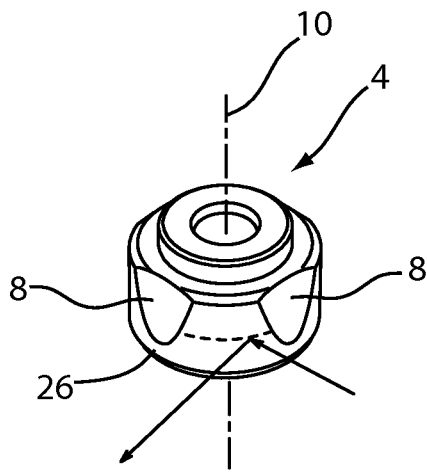
FIG. 3 shows a perspective representation of a deflection mirror as claimed in the present invention.

In the perspective representation according to FIG. 3, it can be seen that the deflection mirror 4 has a substantially cylindrical basic form, into which planar second mirror faces 8, which extend inclinedly to the axis of rotation or cylinder axis 10, are inserted in the form of recesses or indentations. It can be seen from the FIG. that the angle of curvature α or the length of curvature of the first mirror faces 8, in a sectional plane that is perpendicular to the axis of rotation 10, varies with the axial position of the sectional plane, in the example, with reference to the figure, increasing in the direction of the axis of rotation 10 continuously from bottom to top such that the duty cycle of the laser beam LS used for processing the material web is dependent on the axial position in which the laser beam LS, generated by the laser beam source, strikes the deflection mirror 4. Consequently, by displacing the deflection mirror 4 in a direction parallel to the axis of rotation 10, the duty cycle can be steplessly adjusted in a simple manner.

Figure 4:
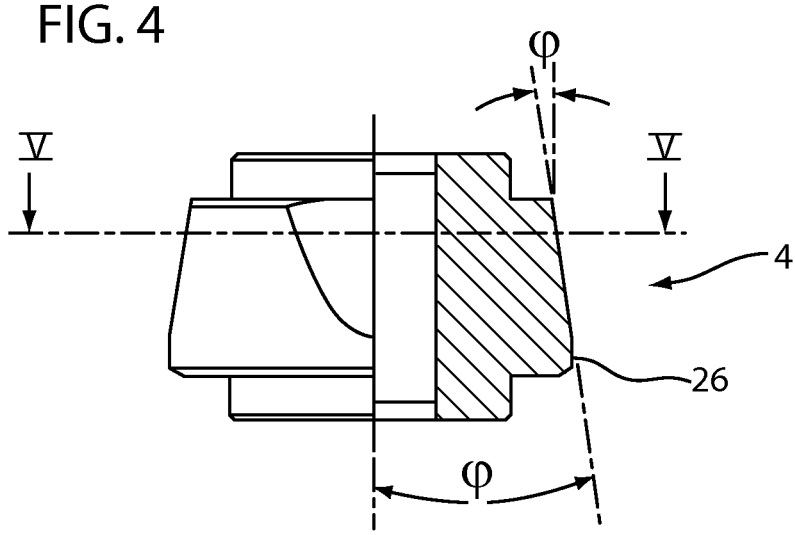
FIG. 4 shows a partial side view and a partial longitudinal section of the deflection mirror.

It can also be seen in FIGS. 3 and 4 that the deflection mirror 4 has a region 26 in which it is circular cylindrical over its entire circumference, such that where a laser beam LS strikes the deflection mirror 4 in this region 26, a continuous incised line is generated in the material web. In other words: The angle ψ at which the second mirror faces 8 are inclined against the axis of rotation 10 as well as the depth of the recess formed by the second mirror faces 8, is set in such a manner that there remains a region 26 that is circular cylindrical over the entire circumference.

Figure 5:
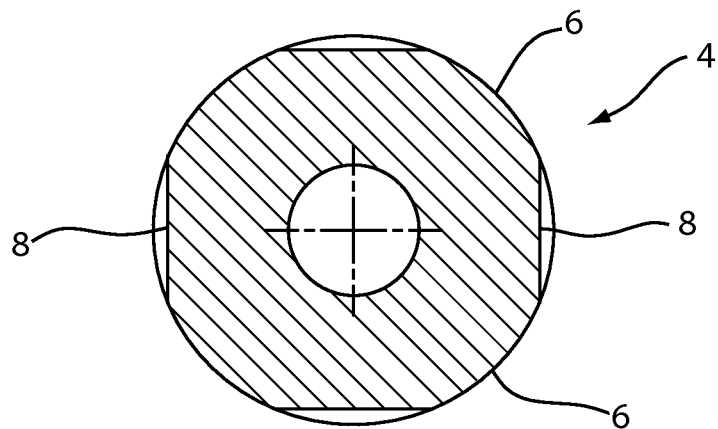
FIG. 5 shows a cross section of the deflection mirror.

The cross section according to FIG. 5 is placed into a sectional plane in which the angles of curvature α, β of first or second mirror face are of identical size and in each case are 45°. When a laser beam strikes the deflection mirror in this sectional plane, a duty cycle of 50% is accordingly generated.

As the first mirror face 6 is a cylinder face, the laser beam LS, after being reflected on said first mirror face, has, in the drawing plane, a divergence that differs from the perpendicular. The collimation optics 12 is consequently made up by at least two aspheric lenses or one toroidal lens in order to parallelize the laser beam LS in both planes.

In the exemplary embodiment according to FIG. 6, a plurality of deflection mirrors 4, in the figure only two are shown for reasons of clarity, are arranged on a common shaft 100 such that they rotate about a common axis of rotation 10. A laser beam LS strikes each of these deflection mirrors 4 such that a plurality, in the example two, of parallel perforated or incised tracks 30 is generated on the material web B (FIG. 7). The plurality of laser beams LS can either be generated, as shown in FIG. 6, by means of a beam splitting device 32 or with the aid of a corresponding number of laser beam sources.

The generation of several perforated or incised tracks in parallel with each other can also be effected by way of a diffractive optical element 35, which is arranged in the beam path of the laser beam LS reflected by the mirror face 6 of a single deflection mirror 4, which generates a multiple beam from one beam. The use of a diffractive optical element of this type for perforating a paper web is known, for example, from commonly assigned U.S. Pat. No. 5,684,617 and its counterpart European patent application EP 0 734 809 A1.

In the exemplary embodiment according to FIG. 8, an acousto-optic modulator 34 is provided in the beam path of the laser beam LS that propagates towards the deflection mirror 4, by means of which modulator, when actuated in a corresponding manner, the laser beam can be deflected such that it is no longer available as a useful beam, but rather strikes an absorber (not shown in the figure). The acousto-optical modulator 34 is preferably arranged in a region of the beam path in which the beam cross section of the laser beam is correspondingly small in order to be able to be completely coupled into the acousto-optic modulator, the geometric dimensions of which are restricted. This is the case for example, in the vicinity of a focal spot of the laser beam LS, for example in front of or after the first focal point $F_1$ situated approximately on the deflection mirror 4 or between the focusing optics 14 and the material web B (FIG. 1). The broken line in FIG. 8 shows the acousto-optic modulator 34 in an alternative position in which it is situated in the beam path of the laser beam LS reflected by the first mirror face 6. The acousto-optic modulator 34 serves as a switch such that an interrupted perforated or incised track 36 is able to be generated by means of said modulator (FIG. 9).

The exemplary embodiment in FIG. 10 provides a deviation mirror 38 which is arranged upstream of the focusing optics 14 between the focusing optics 14 and the collimation optics 12 and is able to be pivoted about an axis of rotation 39 that is oriented parallel to the longitudinal direction 16. In this case, the pivot angle and the focusing optics 14 are matched to each other in such a way that the laser beam LS is always focused by one and the same focusing optics 14. Such an arrangement produces an approximately sinusoidal perforated or incised track 40, as illustrated in FIG. 11. The sinusoidal course of the track 40 may be further varied to different undulations by varying the pivoting of the deviation mirror 38.

According to FIG. 12, a polygonal mirror 42 is mounted upstream of the focusing optics 14. The polygonal mirror also rotates about an axis of rotation 43 that is parallel to the longitudinal direction 16 of the material web B. This configuration produces a saw-tooth shaped or scaled perforation track or incision track 44 as it is shown in FIG. 13.

The invention claimed is:

1. A device for forming grooves or slits in a material web while the material web is being moved in a longitudinal direction, the device comprising:
    a laser beam source configured for generating a continuous laser beam;
    a deflection mirror rotatably mounted about an axis of rotation and displaceable parallel to said axis of rotation;
    said deflection mirror having at least one first mirror face, a line of intersection of said mirror face with a sectional plane defined perpendicular with respect to said axis of rotation forming a circular arc about said axis of rotation, with an angular extent of said circular arc varying in dependence on an axial position of said sectional plane, and said first mirror face deflecting the laser beam into a first direction;
    focusing optics disposed along the first direction for focussing the laser beam, after reflection from said first mirror face, onto the material web while the material web is being moved in the longitudinal direction, for forming grooves or slits in the material web spaced apart from one another in the longitudinal direction;
    said deflection mirror having at least one second mirror face inclined with respect to said first mirror face and said axis of rotation, said second mirror face directly adjoining said first mirror face, said first mirror face and second mirror face alternate in a circumferential direction of said axis of rotation, said second mirror face disposed and shaped for deflecting the laser beam in second directions, different from the first direction; and
    an absorber disposed along the second directions to receive the laser beam after reflection from said second mirror face.

2. The device according to claim 1, wherein the angular extent of said circular arc of said first mirror face decreases continuously in a direction parallel to said axis of rotation.

3. The device according to claim 1, wherein said second mirror face is planar.

4. The device according to claim 1, wherein said deflection mirror is formed with a plurality of said first mirror faces and a respective said second mirror face therebetween.

5. The device according to claim 1, wherein said focusing optics includes a toroidal lens.

6. The device according to claim 1, which comprises an acousto-optic modulator disposed in a beam path of the laser beam spreading out towards said deflection mirror or reflected by said first mirror face.

7. The device according to claim 1, wherein the laser beam generated by said laser beam source is focused in a first focal spot, and said first mirror face is disposed substantially in said focal spot.

8. The device according to claim 7, which comprises collimation optics disposed downstream of said at least one first mirror face.

9. The device according to claim 8, which comprises a deviation mirror pivotally mounted about an axis of rotation parallel to said longitudinal direction and disposed between said collimation optics and said focusing optics.

10. The device according to claim 8, which comprises a polygonal mirror rotatably mounted about an axis of rotation parallel to said longitudinal direction and disposed between said collimation optics and said focusing optics.

11. The device according to claim 1, wherein said deflection mirror is one of a plurality of deflection mirrors disposed spaced apart from one another on a common shaft, and wherein a laser beam is directed onto each of said plurality of deflection mirrors.

12. The device according to claim 1, which comprises a diffractive optical element for generating a multiple beam disposed in the beam path of the laser beam after reflection from said at least one first mirror face.

13. The device according to claim 1, which further comprises a control unit for controlling a laser output and a rotational speed of said deflection mirror in dependence on a speed of the material web.

14. The device according to claim 1, which further comprises a linear drive for displacing said deflection mirror parallel to said axis of rotation.

* * * * *